United States Patent
Kurakami

(10) Patent No.: US 10,728,281 B2
(45) Date of Patent: Jul. 28, 2020

(54) CONNECTION CONTROL APPARATUS, CONNECTION CONTROL METHOD, AND CONNECTION CONTROL PROGRAM

(71) Applicant: NIPPON TELEGRAPH AND TELEPHONE CORPORATION, Chiyoda-ku (JP)

(72) Inventor: Hiroshi Kurakami, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 8 days.

(21) Appl. No.: 15/568,906

(22) PCT Filed: Apr. 21, 2016

(86) PCT No.: PCT/JP2016/062676
§ 371 (c)(1),
(2) Date: Oct. 24, 2017

(87) PCT Pub. No.: WO2016/175131
PCT Pub. Date: Nov. 3, 2016

(65) Prior Publication Data
US 2018/0103059 A1    Apr. 12, 2018

(30) Foreign Application Priority Data
Apr. 28, 2015   (JP) .................... 2015-091695

(51) Int. Cl.
*H04L 29/06* (2006.01)
*H04L 12/66* (2006.01)
*H04L 12/851* (2013.01)

(52) U.S. Cl.
CPC ......... *H04L 63/1458* (2013.01); *H04L 12/66* (2013.01); *H04L 63/1425* (2013.01); *H04L 47/2483* (2013.01); *H04L 2463/142* (2013.01)

(58) Field of Classification Search
CPC . H04L 63/1458; H04L 63/1425; H04L 12/66; H04L 47/2483; H04L 2463/142
See application file for complete search history.

(56) References Cited

U.S. PATENT DOCUMENTS

2002/0146018 A1*  10/2002  Kailamaki .......... H04L 41/0686
                                                370/401
2005/0018618 A1*   1/2005  Mualem .............. H04L 63/1458
                                                370/252

(Continued)

FOREIGN PATENT DOCUMENTS

JP        2012-234236 A       11/2012

OTHER PUBLICATIONS https://ieeexplore.ieee.org/document/6231359/metrics#metrics (Year: 2008).*

(Continued)

*Primary Examiner* — Chau Le
*Assistant Examiner* — Hany S. Gadalla
(74) *Attorney, Agent, or Firm* — Oblon, McClelland, Maier & Neustadt, L.L.P.

(57) ABSTRACT

A connection control apparatus is configured such that a connection count calculator calculates a TCP connection count, which is the number of TCP connections established between a server and one or more clients on a network, of each of servers on the network. The connection control apparatus is configured such that, when a determiner determines that the calculated count is larger than or equal to a predetermined threshold value, an anomalous connection detector detects anomalous connection, and a packet controller controls packet transmission and reception over the anomalous connection.

9 Claims, 12 Drawing Sheets

(56) References Cited

U.S. PATENT DOCUMENTS

| | | | |
|---|---|---|---|
| 2005/0120090 A1* | 6/2005 | Kamiya | H04L 41/0896 709/213 |
| 2006/0045011 A1* | 3/2006 | Aghvami | H04L 47/10 370/230 |
| 2006/0137009 A1* | 6/2006 | Chesla | G06F 21/552 726/22 |
| 2008/0295175 A1* | 11/2008 | Ansari | H04L 63/1416 726/23 |
| 2010/0054123 A1* | 3/2010 | Yong | H04L 43/0864 370/230 |
| 2011/0197278 A1* | 8/2011 | Chow | H04L 63/1416 726/24 |
| 2011/0242979 A1* | 10/2011 | Feroz | H04L 47/17 370/235 |
| 2012/0278445 A1* | 11/2012 | Sagara | H04L 67/2804 709/219 |
| 2013/0322255 A1* | 12/2013 | Dillon | H04L 47/22 370/236 |
| 2014/0325648 A1* | 10/2014 | Liu | H04L 63/1458 726/22 |
| 2015/0201377 A1* | 7/2015 | Harrison | H04W 52/0229 370/311 |

OTHER PUBLICATIONS https://www.symantec.com/connect/articles/guide-different-kinds-honeypots (Year: 2008).*

International Search Report dated Jun. 14, 2016 in PCT/JP2016/062676 filed Apr. 21, 2016.

Shibaike, Yoshikazu, "Targeted scene, Enhance[d] security," Nikkei Systems, No. 233, Aug. 2012, 27 pages (with English Translation).

Nakatomi, Kunio et al., "IPCOM Visualizer Function: Optimizing Networks and Security Functions Through Visualization," PFU Technical Review, vol. 25, No. 1, Jan. 2014, 36 pages. (with English Translation).

Park, Junhan et al., "Analysis of Slow Read DoS Attack and Countermeasures on Web servers," International Journal of Cyber-Security and Digital Forensics (IJCSDF), the Society of Digital Information and Wireless Communications, vol. 4, No. 2, 2015, pp. 339-353 Additional References sheet(s) attached.

* cited by examiner

FIG.3

| No. | Source IP Address | Destination IP Address | Source Port Number | Destination Port Number |
|---|---|---|---|---|
| 1 | 10.0.1.1 | 10.0.0.1 | 51001 | 21 |
| 2 | 10.0.1.1 | 10.0.0.1 | 51002 | 21 |
| 3 | 10.0.1.1 | 10.0.0.1 | 51003 | 80 |
| 4 | 10.0.1.1 | 10.0.0.1 | 51004 | 80 |
| 5 | 10.0.1.1 | 10.0.0.1 | 51005 | 80 |
| 6 | 10.0.1.2 | 10.0.0.1 | 51001 | 80 |
| 7 | 10.0.1.2 | 10.0.0.2 | 51002 | 80 |
| 8 | 10.0.1.2 | 10.0.0.2 | 51002 | 80 |
| 9 | 10.0.1.2 | 10.0.0.2 | 51002 | 80 |
| 10 | 10.0.1.2 | 10.0.0.2 | 51002 | 80 |
| 11 | 10.0.1.2 | 10.0.0.2 | 51002 | 80 |
| 12 | 10.0.1.2 | 10.0.0.2 | 51002 | 80 |
| 13 | 10.0.1.2 | 10.0.0.2 | 51002 | 80 |
| 14 | 10.0.1.2 | 10.0.0.2 | 51002 | 80 |
| 15 | 10.0.1.2 | 10.0.0.2 | 51002 | 80 |
| 16 | 10.0.1.2 | 10.0.0.2 | 51002 | 80 |
| 17 | 10.0.1.2 | 10.0.0.2 | 51003 | 80 |

FIG.4

| Source IP Address | Destination IP Address | Source Port Number | Destination Port Number |
|---|---|---|---|
| 10.0.1.1 | 10.0.0.1 | 51001 | 21 |
| 10.0.1.1 | 10.0.0.1 | 51002 | 21 |
| 10.0.1.1 | 10.0.0.1 | 51003 | 80 |
| 10.0.1.1 | 10.0.0.1 | 51004 | 80 |
| 10.0.1.1 | 10.0.0.1 | 51005 | 80 |
| 10.0.1.2 | 10.0.0.1 | 51001 | 80 |
| 10.0.1.2 | 10.0.0.2 | 51002 | 80 |
| 10.0.1.2 | 10.0.0.2 | 51003 | 80 |

FIG.5

| Destination IP Address | Connection Count |
|---|---|
| 10.0.0.1 | 6 |
| 10.0.0.2 | 2 |

FIG.6

| Source IP Address | Connection Count |
|---|---|
| 10.0.1.1 | 5 |
| 10.0.1.2 | 3 |

FIG.7

| No. | Source IP Address | Destination IP Address | Source Port Number | Destination Port Number | TCP Window Size (KB) | Round-Trip Time (s) | Theoretical Throughput (kbps) | Actual Throughput (kbps) | Actual Throughput/ Theoretical Throughput |
|---|---|---|---|---|---|---|---|---|---|
| 1 | 10.0.1.1 | 10.0.0.1 | 51001 | 21 | 64 | 0.01 | 51200 | 41259 | 0.81 |
| 2 | 10.0.1.1 | 10.0.0.1 | 51002 | 21 | 64 | 0.02 | 25600 | 20839 | 0.81 |
| 3 | 10.0.1.2 | 10.0.0.2 | 51002 | 80 | 64 | 0.005 | 102400 | 1055 | 0.01 |
| 4 | 10.0.1.2 | 10.0.0.2 | 51003 | 80 | 32 | 0.01 | 25600 | 2186 | 0.09 |

CONNECTION CONTROL APPARATUS, CONNECTION CONTROL METHOD, AND CONNECTION CONTROL PROGRAM

FIELD

The present invention relates to connection control apparatuses, connection control methods, and connection control programs.

BACKGROUND

Analyzing packets to determine anomaly according to a packet counter has conventionally been performed as a countermeasure against network attacks by means of denial-of-service attacks. However, denial-of-service attacks are not limited to attacks that use a large amount of packets; some may be conducted by an attack method that, despite using a small amount of packets, occupies Transmission Control Protocol (TCP) connections of a server. The packet-count-based countermeasure fails to prevent such a connection occupying attack, which is a problem.

Against this problem, a countermeasure using existing Web Application Firewall (WAF) is taken. For instance, as a countermeasure against connection-occupying anomalous traffic, a technique based on connection duration timeout has been proposed (see, for example, Non Patent Literature 1).

CITATION LIST

Non Patent Literature

Non Patent Literature 1: Junhan Park, Keisuke Iwai, Hidema Tanaka, and Takakazu Kurokawa, "Analysis of Slow Read DoS Attack and Countermeasures on Web servers", International Journal of Cyber-Security and Digital Forensics (IJCSDF) 4(2): 339-353

SUMMARY

Technical Problem

However, disadvantageously, the existing-WAF-based countermeasure against connection-occupying anomalous traffic can detect only several types of attacks. The technique based on connection duration timeout disadvantageously sacrifices normal traffic, e.g., a normal long-duration session. Furthermore, the technique is disadvantageous in that when new attack connections come and occupy one after another at intervals shorter than a connection-timeout time period, a denial-of-service condition is sustained.

Under the circumstances, the present invention aims at preventing connection occupying attack without affecting normal traffic.

Solution to Problem

To solve a problem and to achieve an object, A connection control apparatus includes: a connection count calculator that calculates a TCP connection count, the TCP connection count being the number of TCP connections established between a server and a client on a network, of each of servers on the network; a determiner that determines whether the TCP connection count of each of the servers is larger than or equal to a predetermined threshold value; and an anomalous connection detector that, when the TCP connection count of a server of the servers is determined to be larger than or equal to the predetermined threshold value by the determiner, detects anomalous connection that conducts denial-of-service attack on the server.

A connection control method to be performed by a connection control apparatus, the connection control method includes: calculating a TCP connection count, the TCP connection count being the number of TCP connections established between a server and a client on a network, of each of servers on the network; determining whether the TCP connection count of each of the servers is larger than or equal to a predetermined threshold value; and when the TCP connection count of a server of the servers is determined to be larger than or equal to the predetermined threshold value at the determining, detecting anomalous connection that conducts denial-of-service attack on the server.

Advantageous Effects of Invention

According to the present invention, connection occupying attack can be prevented without affecting normal traffic.

BRIEF DESCRIPTION OF DRAWINGS

FIG. 3 is a diagram illustrating an example of header information of packets according to the first embodiment.

FIG. 4 is a diagram illustrating an example of TCP connections according to the first embodiment.

FIG. 5 is a diagram illustrating an example of destinations and connection counts according to the first embodiment.

FIG. 6 is a diagram illustrating an example of transmission sources and connection counts according to the first embodiment.

FIG. 7 is a diagram illustrating an example of ratios of actual throughputs to theoretical throughputs according to the first embodiment.

DESCRIPTION OF EMBODIMENTS

Embodiments of connection control apparatuses and connection control methods according to the present disclosure are described in detail below with reference to the drawings. The embodiments are not intended to limit the connection control apparatuses and the connection control methods according to the present disclosure in any way.

First Embodiment

In the embodiments below, configurations and processing of a first embodiment are described; advantages of the first embodiment will be described last.

Configuration of First Embodiment

Figure 1:
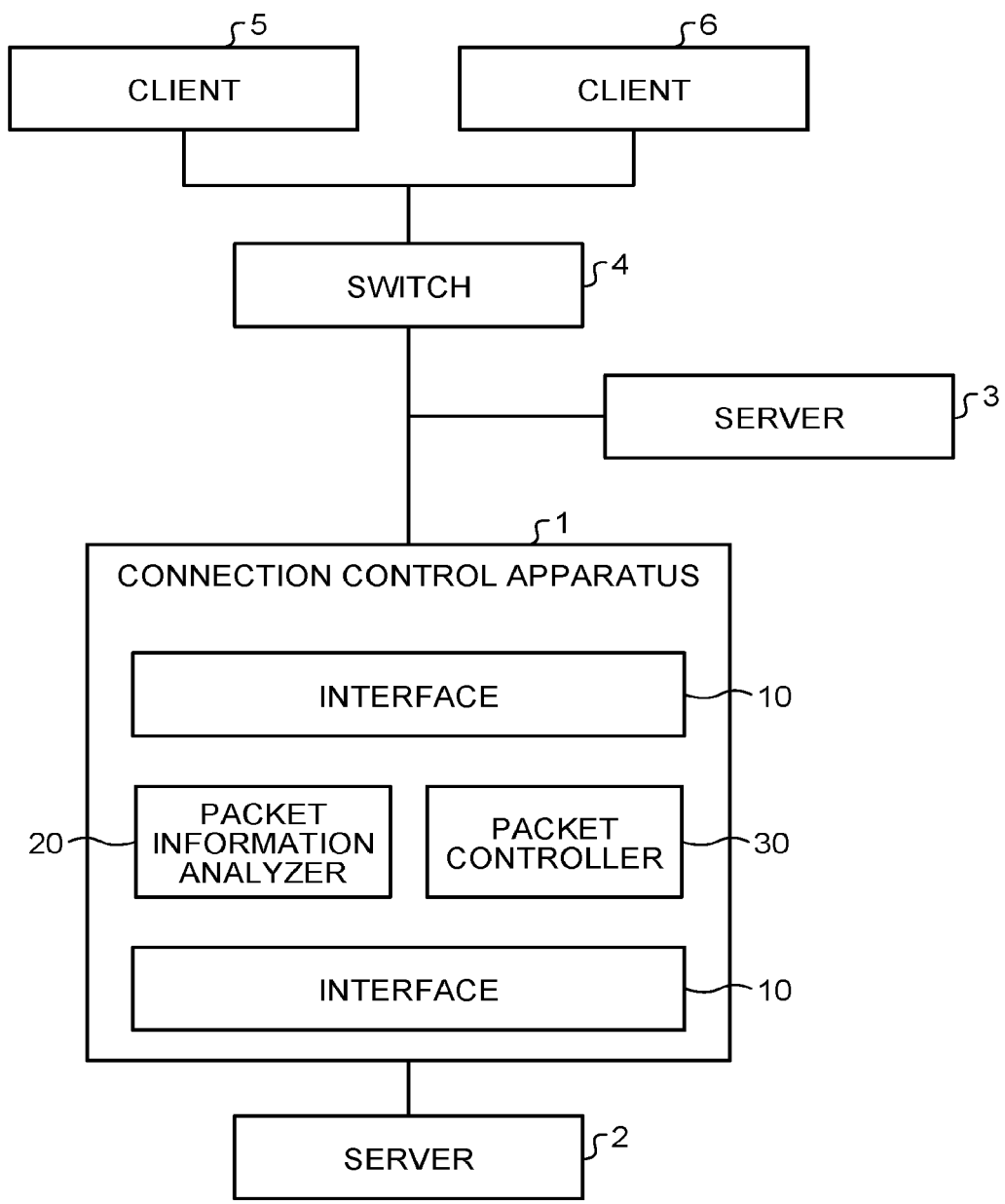
FIG. 1 is a diagram illustrating an example of a configuration of a network including a connection control apparatus according to a first embodiment.

A configuration of a network including a connection control apparatus according to the first embodiment is described first with reference to FIG. 1. FIG. 1 is a diagram illustrating an example of the configuration of the network including the connection control apparatus according to the first embodiment.

As illustrated in FIG. 1, the network includes, for instance, a connection control apparatus 1, a server 2, a server 3, a switch 4, a client 5, and a client 6. The clients 5 and 6 can establish TCP connections with the servers 2 and 3 and transmit and receive packets. For instance, a packet, which is emitted from the client 5, destined for the server 2 flows to the server 2 via the switch 4 and the connection control apparatus 1. A packet, which is emitted from the server 2, destined for the client 5 flows to the client 5 via the connection control apparatus 1 and the switch 4.

Note that the network illustrated in FIG. 1 is only an example; a plurality of servers may be connected to the connection control apparatus 1 or the switch 4. In view of an actual environment, e.g., the Internet, there are conceivably a myriad of clients that can establish TCP connections with the server 2 and the server 3 and transmit and receive packets thereto and therefrom. Although the connection control apparatus 1 is provided inline in FIG. 1, the connection control apparatus 1 may alternatively be located on a mirror port.

As illustrated in FIG. 1, the connection control apparatus 1 includes an interface 10, a packet information analyzer 20, and a packet controller 30. Firstly, the packet information analyzer 20 performs packet analysis and the like. The packet controller 30 controls packet transmission and reception according to a result of analysis performed by the packet information analyzer 20. The interface 10, which is connected to the switch 4 or the server 2, transmits and receives packets under control of the packet controller 30.

Figure 2:
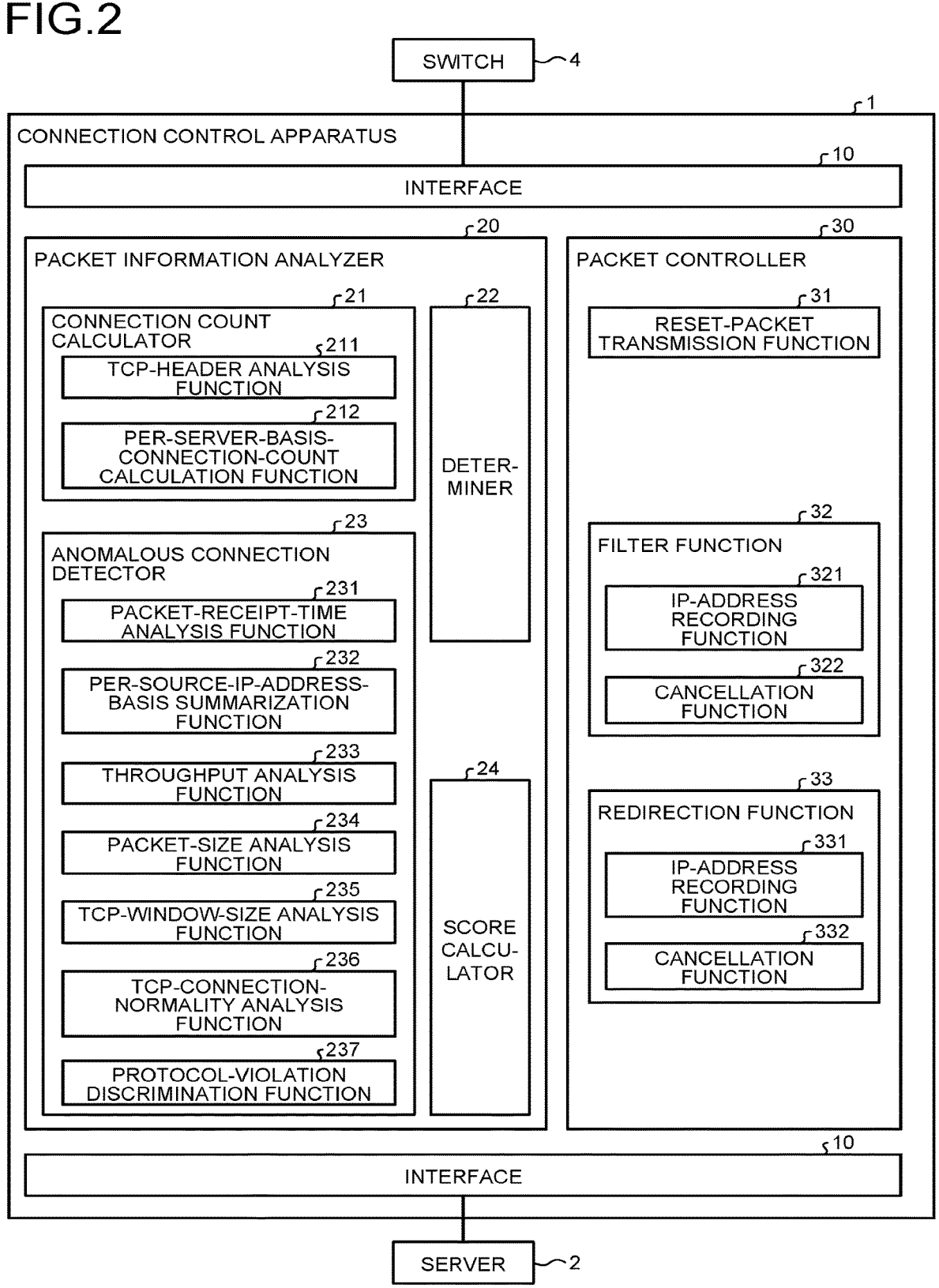
FIG. 2 is a diagram illustrating an example of a configuration of the connection control apparatus according to the first embodiment.

A configuration of the connection control apparatus 1 is described below with reference to FIG. 2. FIG. 2 is a diagram illustrating an example of the configuration of the connection control apparatus according to the first embodiment. As described above, the connection control apparatus 1 includes the interface 10, the packet information analyzer 20, and the packet controller 30. The packet information analyzer 20 and the packet controller 30 are particularly described in detail below.

The packet information analyzer 20 includes a connection count calculator 21, a determiner 22, an anomalous connection detector 23, and a score calculator 24. The connection count calculator 21 calculates a TCP connection count, which is the number of TCP connections established between a server and a client on the network, of each of the servers. The determiner 22 determines whether the TCP connection count of each of the servers is larger than or equal to a predetermined threshold value. When the TCP connection count of a server of the servers is determined to be larger than or equal to the predetermined threshold value by the determiner 22, the anomalous connection detector 23 detects anomalous connection that conducts denial-of-service attack on the server.

The connection count calculator 21 includes a TCP-header analysis function 211 and a per-server-basis-connection-count calculation function 212. The connection count calculator 21 summarizes counts of the TCP connections on a per-destination-IP-address basis, where the destination IP addresses are contained in header information of packets of the TCP connections, using the functions. Firstly, the TCP-header analysis function 211 extracts header information, such as destination IP addresses, source port numbers, and destination port numbers, from TCP headers and IP headers contained in packets received by the interface 10. The per-server-basis-connection-count calculation function 212 calculates per-server-basis unique connection counts from the information extracted by the TCP-header analysis function 211.

A method of calculating the per-server-basis unique connection counts is described below using FIG. 3 to FIG. 5. Firstly, as illustrated in FIG. 3, the TCP-header analysis function 211 extracts packets' header information from TCP headers and IP headers contained in the packets. FIG. 3 is a diagram illustrating an example of header information of packets according to the first embodiment. Examples of items of header information to be extracted include source IP address, destination IP address, source port number, and destination port number as illustrated in FIG. 3. Note that FIG. 3 illustrates an example simplified for convenience of description; the number of packets, from which the TCP-header analysis function 211 actually extracts header information, is not limited to that illustrated in FIG. 3, and can be a considerably large number.

For instance, the row numbered 1 of FIG. 3 indicates that the source IP address of a certain packet is "10.0.1.1", its destination IP address is "10.0.0.1", its source port number is "51001", and its destination port number is "21". The row numbered 6 indicates that the source IP address of a certain packet is "10.0.1.2", its destination IP address is "10.0.0.1", its source port number is "51001", and its destination port number is "80". Comparison between the row numbered 1 and the row numbered 6 indicates that the packets are of different TCP connections because the packets differ in source IP address and destination port number.

Packets that are identical in source IP address, destination IP address, source port number, and destination port number can be considered to be of a single TCP connection. Hence, the per-server-basis-connection-count calculation function 212 aggregates the header information extracted by the TCP-header analysis function 211 on a per-connection basis as illustrated in FIG. 4. FIG. 4 is a diagram illustrating an example of TCP connections according to the first embodiment.

For instance, the packets numbered 7 to 16 of FIG. 3 are identical in source IP address, destination IP address, source port number, and destination port number and therefore packets of a single TCP connection. By contrast, although the packet numbered 1 and the packet numbered 2 are identical in source IP address, destination IP address, and destination port number, the packets differ in source port number; hence, it is indicated that the packets are of different TCP connections.

As illustrated in FIG. 5, the per-server-basis-connection-count calculation function 212 calculates per-server-basis unique connection counts by summarizing connection counts on a per-server basis, where the servers are destinations of the packets, or, in other words, on a per-destination-IP-address basis. FIG. 5 is a diagram illustrating an example of destinations and connection counts according to the first embodiment. In this example, the unique connection count of the server whose destination IP address is "10.0.0.1" is 6; the unique connection count of the server whose destination IP address is "10.0.0.2" is 2.

The determiner 22 determines, for each of the servers, whether to perform anomalous connection detection and packet control according to the per-server-basis unique connection count calculated by the connection count calculator 21. For instance, the determiner 22 may be configured to determine to perform anomalous connection detection and packet control on a server whose connection count is larger than or equal to a predetermined threshold value. In this case, when the threshold value is set to 5, the determiner 22 will determine to perform anomalous connection detection and packet control on the server whose destination IP address is "10.0.0.1" illustrated in FIG. 5, but not to perform anomalous connection detection and packet control on the server whose destination IP address is "10.0.0.2".

The above example has been described through an example where packets, the transmission source of each of which is a client and the destination of the same is a server, are used. Alternatively, packets, the transmission source of each of which is a server and the destination of the same is a client, or both packets, the transmission source of each of which is a client and the destination of the same is a server, and packets, the transmission source of each of which is a server and the destination of the same is a client, may be used. In a situation where both the packets are used, one packet and another packet can be considered to be of a single TCP connection, if IP addresses and port numbers of the one packet, the transmission source of which is a client and the destination of which is a server, are identical to IP addresses and port numbers, where the transmission source and the destination are interchanged, of the other packet, the transmission source of which is the server and the destination of which is the client. The connection counts are not necessarily calculated from header information of packets; alternatively, information, e.g., a command for obtaining a process state or a connections' statistics state of a server, obtainable from the server can be used in calculation of the connection counts.

The anomalous connection detector 23 includes a packet-receipt-time analysis function 231, a per-source-IP-address-basis summarization function 232, a throughput analysis function 233, a packet-size analysis function 234, a TCP-window-size analysis function 235, a TCP-connection-normality analysis function 236, and a protocol-violation discrimination function 237. The anomalous connection detector 23 detects anomalous connection that conducts denial-of-service attack using any one or a combination of two or more of the functions.

The functions of the anomalous connection detector 23 are described below. The packet-receipt-time analysis function 231 retrieves the time of day when the interface 10 has received a packet. The per-source-IP-address-basis summarization function 232 summarizes counts of packets on a per-source-IP-address basis according to source IP addresses of the packets. The throughput analysis function 233 calculates a theoretical throughput and an actual throughput. The packet-size analysis function 234 obtains a packet size. The TCP-window-size analysis function 235 obtains a window size of a TCP connection. The TCP-connection-normality analysis function 236 discriminates whether the TCP connection is in a half-closed mode or, put another way, in a state where although a connection-closing signal has been transmitted from the server, a connection-closing signal is not returned to the server. The protocol-violation discrimination function 237 discriminates whether the TCP connection violates a protocol.

Examples of a method, through which the anomalous connection detector 23 detects anomalous connection and the score calculator 24 assigns an anomaly score, are described below. The anomalous connection detector 23 may employ either any one or a combination of two or more of the methods described below. Methods for detecting anomalous connection are not limited to those described below, but any known method can be used.

(Method 1)

In Method 1, when a count of TCP connections summarized on a per-source-IP-address basis, where the source IP addresses are contained in header information of packets of the TCP connections, is larger than or equal to a predetermined threshold value, the anomalous connection detector 23 detects the TCP connections as anomalous connection. The packet-receipt-time analysis function 231 retrieves times of day when the packets are received by the interface 10. Next, the per-source-IP-address-basis summarization function 232 summarizes connection counts on a per-source-IP-address basis, where the source IP addresses are transmission sources of packets whose times of day retrieved by the packet-receipt-time analysis function 231 are earlier than a certain time of day, and performs sorting in order of connection count.

FIG. 6 illustrates an example where summarization is performed on the basis of FIG. 4. FIG. 6 is a diagram illustrating an example of transmission sources and connection counts according to the first embodiment. FIG. 6 indicates that the connection count of the destination IP address "10.0.1.1" is 5; the connection count of the destination IP address "10.0.1.2" is 3.

When Method 1 is employed, the score calculator 24 calculates and assigns an anomaly score for each of the source IP addresses according to, for instance, the connection counts or an order of the connection counts. For instance, the score calculator 24 may assign an anomaly score when a connection count is larger than or equal to a predetermined threshold value. For convenience of description, the connection counts in FIG. 6 are relatively small; however, a client that actually conducts a connection occupying attack can establish several dozens to several hundreds of TCP connections. By contrast, a normal client typically establishes several connections at most.

(Method 2)

In Method 2, the anomalous connection detector 23 detects a TCP connection as anomalous connection when a ratio of an actual throughput, which is calculated from a packet size of a packet transmitted and received over the TCP connection, to a theoretical throughput, which is calculated from a TCP window size and a round-trip time of the TCP connection, is smaller than or equal to a predetermined threshold value. The packet-receipt-time analysis function 231 retrieves the time of day when a packet is received by the interface 10. The TCP-window-size analysis function 235 obtains a TCP window size of the packet. The throughput analysis function 233 calculates round-trip time from the time of day when the packet is received and calculates a theoretical throughput using Equation (1).

Theoretical throughput (kbps)=TCP window size (KB)*8/Round-trip time (s)     (1)

The packet-size analysis function 234 obtains a packet size. The throughput analysis function 233 calculates an actual throughput by, for example, calculating a packet size transmitted and received per unit time. The throughput analysis function 233 further calculates a ratio of the actual throughput to the theoretical throughput. Thereafter, the score calculator 24 assigns an anomaly score to a client corresponding to a source IP address of a TCP connection whose ratio of the actual throughput to the theoretical throughput is smaller than or equal to the predetermined threshold value.

A specific example of Method 2 is described with reference to FIG. 7. FIG. 7 is a diagram illustrating an example of ratios of actual throughputs to theoretical throughputs according to the first embodiment. As illustrated in FIG. 7, rows numbered 1 to 4 indicate TCP window sizes, round-trip times, theoretical throughputs, actual throughputs, and ratios of the actual throughputs to the theoretical throughputs of TCP connections that differ in source IP address, destination IP address, source port number, and destination port number.

For instance, the TCP connection numbered 1 of FIG. 7 indicates that its source IP address is "10.0.1.1", its destination IP address is "10.0.0.1", its source port number is "51001", its destination port number is "21", its TCP window size is 64 KB, and its round-trip time is 0.01 seconds. The theoretical throughput of the TCP connection numbered 1 is 51200 kbps and its actual throughput is 41259 kbps. Accordingly, the ratio of the actual throughput to the theoretical throughput is 0.81.

The TCP connection numbered 3 of FIG. 7 indicates that its source IP address is "10.0.1.2", its destination IP address is "10.0.0.2", its source port number is "51002", its destination port number is "80", its TCP window size is 64 KB, and its round-trip time is 0.005 seconds. The theoretical throughput of the TCP connection numbered 3 is 102400 kbps and its actual throughput is 1055 kbps. Accordingly, the ratio of the actual throughput to the theoretical throughput is 0.01.

When, for instance, the threshold value for anomaly score assignment by the score calculator 24 is set to 0.1, the ratio of the actual throughput to the theoretical throughput of the TCP connection numbered 1 and that of the TCP connection numbered 2 of FIG. 7 are larger than 0.1, and therefore the score calculator 24 does not assign an anomaly score to the source IP address. By contrast, the ratio of the actual throughput to the theoretical throughput of the TCP connection numbered 3 and that of the TCP connection numbered 4 of FIG. 7 are smaller than or equal to 0.1, and therefore the score calculator 24 assigns an anomaly score to the source IP address. The score calculator 24 may alternatively be configured such that, when the ratio is smaller than the threshold value, the score calculator 24 calculates and assigns a score depending on duration of the TCP connection, rather than assigning an anomaly score to the source IP address without exception.

(Method 3)

In Method 3, the anomalous connection detector 23 detects a TCP connection as anomalous connection when the TCP connection is closed by the server and the TCP connection is not closed by the client. Specifically, when, although a packet with TCP flag FIN set has been transmitted from the server as a signal for closing the connection, a packet with TCP flags FIN and ACK set is not received for a certain period of time or longer from the client, and hence an attempt to close the TCP connection is made only by the server, the TCP-connection-normality analysis function 236 determines that the TCP connection is in the half-closed mode. The score calculator 24 assigns an anomaly score to a source IP address of the TCP connection determined to be in the half-closed mode.

(Method 4)

In Method 4, the anomalous connection detector 23 detects a TCP connection as anomalous connection when a TCP window size of the TCP connection is smaller than a predetermined threshold value or when a ratio of a packet size of a packet of the TCP connection to the TCP window size is smaller than or equal to a predetermined threshold value. Specifically, the score calculator 24 assigns an anomaly score to a source IP address of a TCP connection when the TCP window size obtained by the TCP-window-size analysis function 235 is smaller than the predetermined size or when an actual packet size obtained by the packet-size analysis function 234 deviates from the TCP window size.

(Method 5)

In Method 5, the anomalous connection detector 23 detects a TCP connection as anomalous connection when a packet violating a protocol is transmitted and received over the TCP connection. Specifically, the protocol-violation discrimination function 237 discriminates and extracts a TCP connection that violates a protocol. Examples of the protocol violation include an incomplete HTTP GET header. The score calculator 24 assigns an anomaly score to a source IP address of the extracted TCP connection.

The packet controller 30 performs attack-prevention control on a client corresponding to a source IP address of a TCP connection, to which an anomaly score is assigned by the above-described method, or a TCP connection whose anomaly score has reached a predetermined value or larger.

The packet controller 30 controls packet transmission and reception to and from a client that has established anomalous connection detected by the anomalous connection detector 23 with the server. Specifically, the packet controller 30 transmits a TCP-connection reset packet to the client of the anomalous connection. Furthermore, the packet controller 30 sets a filter that discards packets of the anomalous connection. Furthermore, the packet controller 30 redirects the packets of the anomalous connection to a server prepared in advance.

The packet controller 30 includes a reset-packet transmission function 31, a filter function 32, and a redirection function 33. The packet controller 30 performs control using any one or a combination of two or more of the functions. The reset-packet transmission function 31 resets the TCP connection by responding to an IP address of the client, which is a controlled object, as a proxy of the server and transmitting a packet with TCP flag RST set to the IP address.

The filter function 32 records the IP address of the client, which is the controlled object, using an IP-address recording function 321 and sets a filter that discards packets, the transmission sources of which are the recorded IP address, in the interface 10. A cancellation function 322 cancels the filter when, for instance, a count of packets per unit time is smaller than or equal to a certain value for a certain period of time.

The redirection function 33 records the IP address of the client, which is the controlled object, using an IP-address recording function 331 and automatically redirects packets, the transmission sources of which are the recorded IP address, to a server of another site prepared in advance. A configuration, in which when a packet is received from the same source IP address again, manual judgment is made and, when the packet is judged to be normal communication, a cancellation function 332 makes omission from controlled objects, may be employed.

A configuration in which, when a total connection count of the server is below a certain value for a certain period of time, the reset-packet transmission function 31 stops transmitting the reset packet, the cancellation function 322 cancels the filter, and the cancellation function 332 cancels redirection, may be employed. The packet information analyzer 20 may be configured to store sequence numbers of individual TCP connections so that packet transmission and reception can be continued when the control performed by the packet controller 30 is canceled.

Processing of First Embodiment

Figure 8:
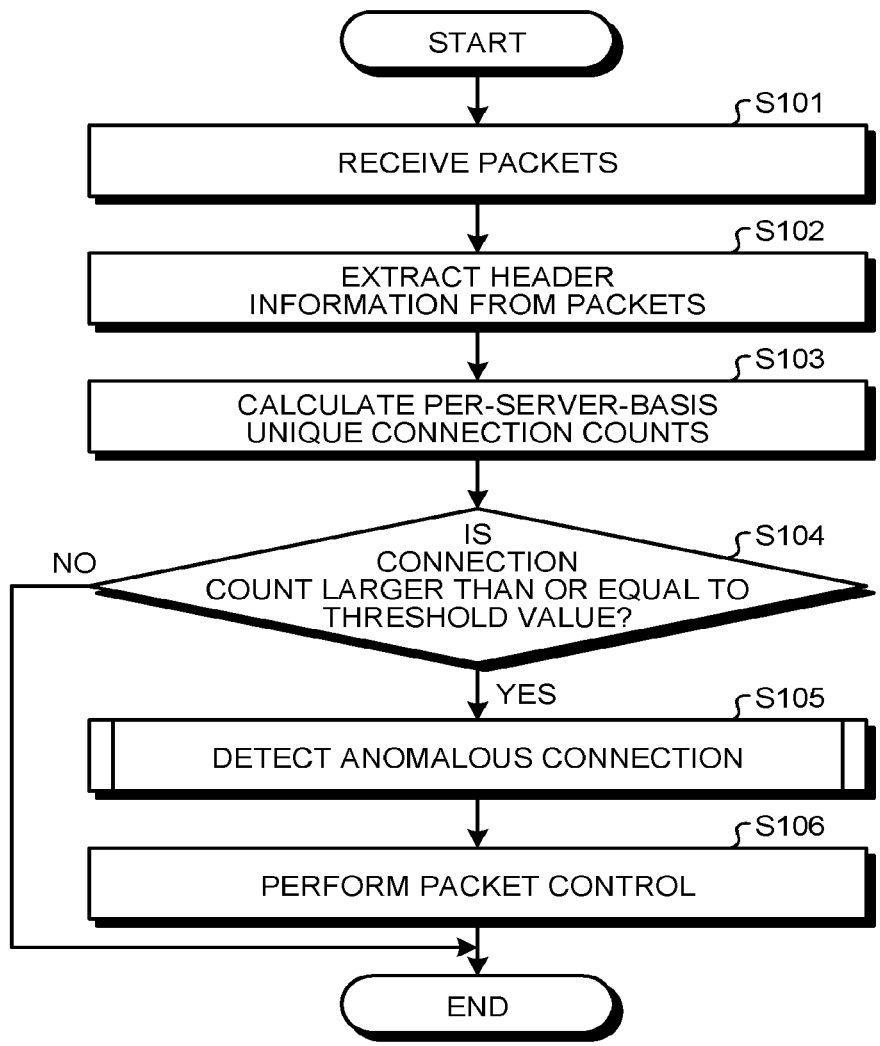
FIG. 8 is a flowchart illustrating an example of processing of the connection control apparatus according to the first embodiment.

Next, processing of the connection control apparatus 1 is described with reference to, e.g., FIG. 8. FIG. 8 is a flowchart illustrating an example of processing of the connection control apparatus according to the first embodiment. As illustrated in FIG. 8, the interface 10 receives packets (Step S101). Next, the connection count calculator 21 of the packet information analyzer 20 extracts header information from the packets (Step S102). The connection count calculator 21 calculates per-server-basis unique connection counts by, for instance, summarizing connection counts on a per-destination-IP-address basis (Step S103).

The determiner 22 determines, for each of servers, whether the per-server-basis unique connection count calculated by the connection count calculator 21 is larger than or equal to a threshold value (Step S104). When the connection count is neither larger than nor equal to the threshold value (No at Step S104), the connection control apparatus 1 completes processing without performing subsequent processing. On the other hand, when the connection count is larger than or equal to the threshold value (Yes at Step S104), the anomalous connection detector 23 of the packet information analyzer 20 detects anomalous connection (Step S105). The packet controller 30 performs packet control on a transmission source of the detected anomalous connection (Step S106).

The process (Step S105) performed by the anomalous connection detector 23 of the packet information analyzer 20 to detect anomalous connection is similar to that of Methods 1 to 5 described above. Examples of the process performed by the anomalous connection detector 23 to detect anomalous connection are described below with reference to FIG. 9 to FIG. 13. FIG. 9 to FIG. 13 are flowcharts each illustrating an example of the detection process of the connection control apparatus according to the first embodiment.

(Method 1)

Figure 9:
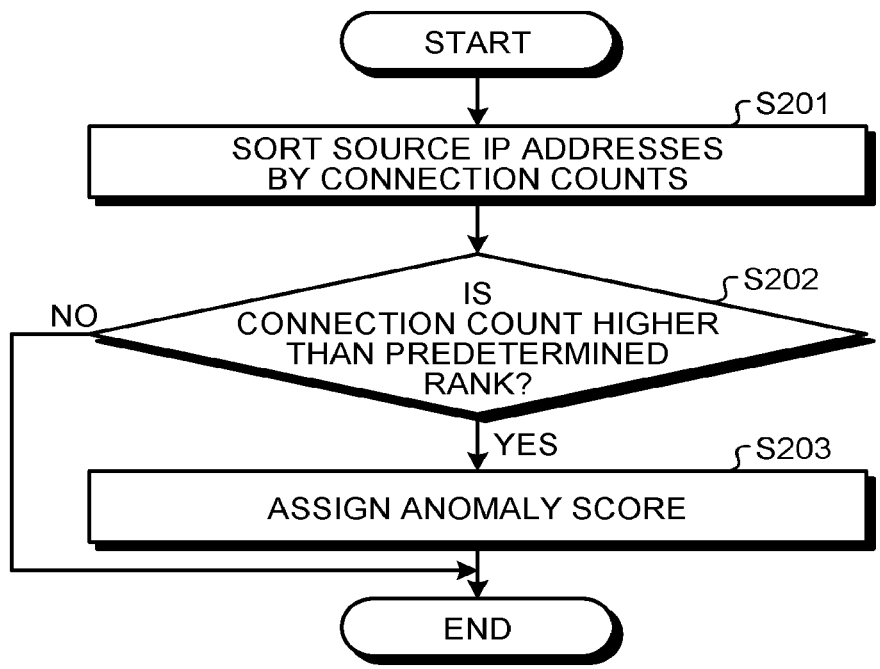
FIG. 9 is a flowchart illustrating an example of a detection process of the connection control apparatus according to the first embodiment.

In Method 1, as illustrated in FIG. 9, the per-source-IP-address-basis summarization function 232 summarizes the connection counts on a per-source-IP-address basis and sorts source IP addresses by the connection counts (Step S201). The anomalous connection detector 23 may perform this step on packets, the receipt time of which retrieved by the packet-receipt-time analysis function 231 is earlier than a predetermined time of day. The score calculator 24 assigns an anomaly score (Step S203) to, for instance, a source IP address whose rank in the sorted order is higher than a predetermined rank (Yes at S202). When the rank in the sorted order is not higher than the predetermined rank (No at S202), the score calculator 24 does not assign an anomaly score.

(Method 2)

Figure 10:
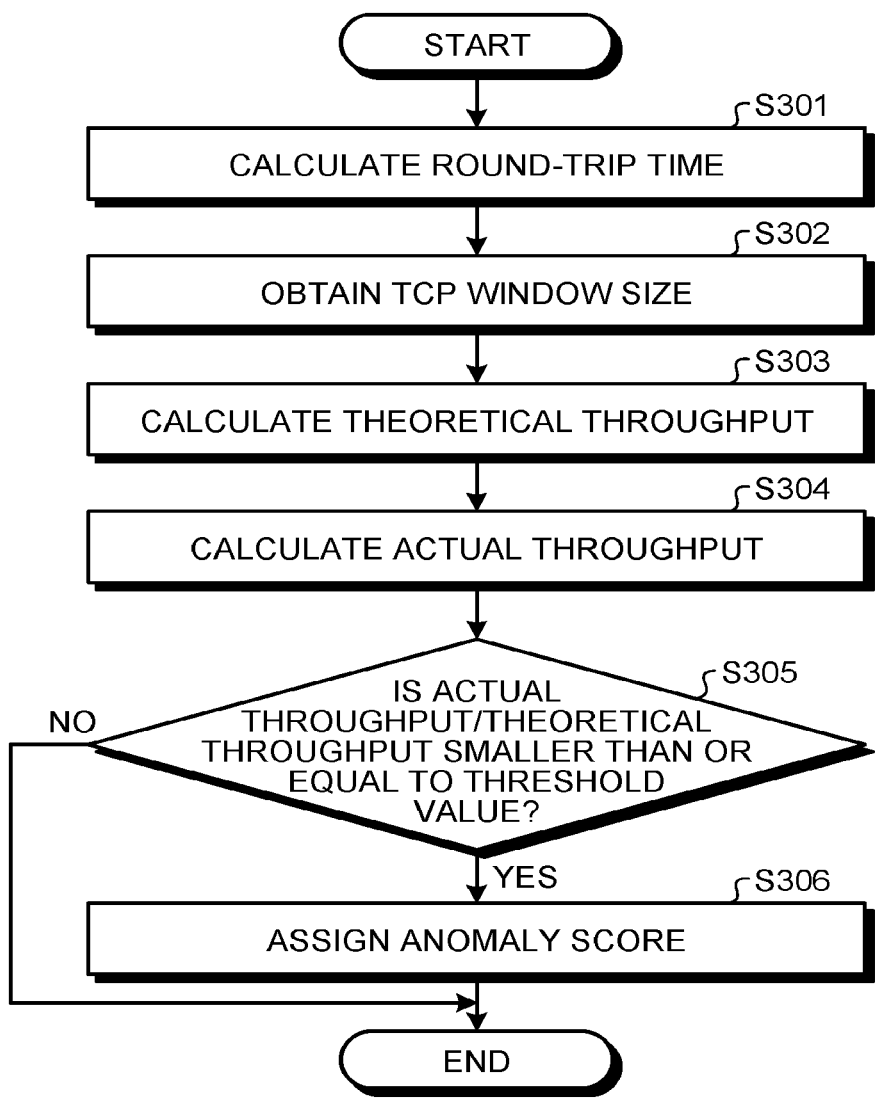
FIG. 10 is a flowchart illustrating an example of the detection process of the connection control apparatus according to the first embodiment.

In Method 2, as illustrated in FIG. 10, the throughput analysis function 233 calculates a round-trip time from receipt time retrieved by the packet-receipt-time analysis function 231 (Step S301). Next, the TCP-window-size analysis function 235 obtains a TCP window size (Step S302). The throughput analysis function 233 calculates a theoretical throughput from the round-trip time and the TCP window size (Step S303). The throughput analysis function 233 further calculates an actual throughput from a packet size obtained by the packet-size analysis function 234 (Step S304). When, for instance, a ratio of the actual throughput to the theoretical throughput is smaller than or equal to a predetermined threshold value (Yes at Step S305), the score calculator 24 assigns an anomaly score to the source IP address (Step S306). When the ratio of the actual throughput to the theoretical throughput is neither smaller than nor equal to the predetermined threshold value (No at Step S305), the score calculator 24 does not assign an anomaly score.

(Method 3)

Figure 11:
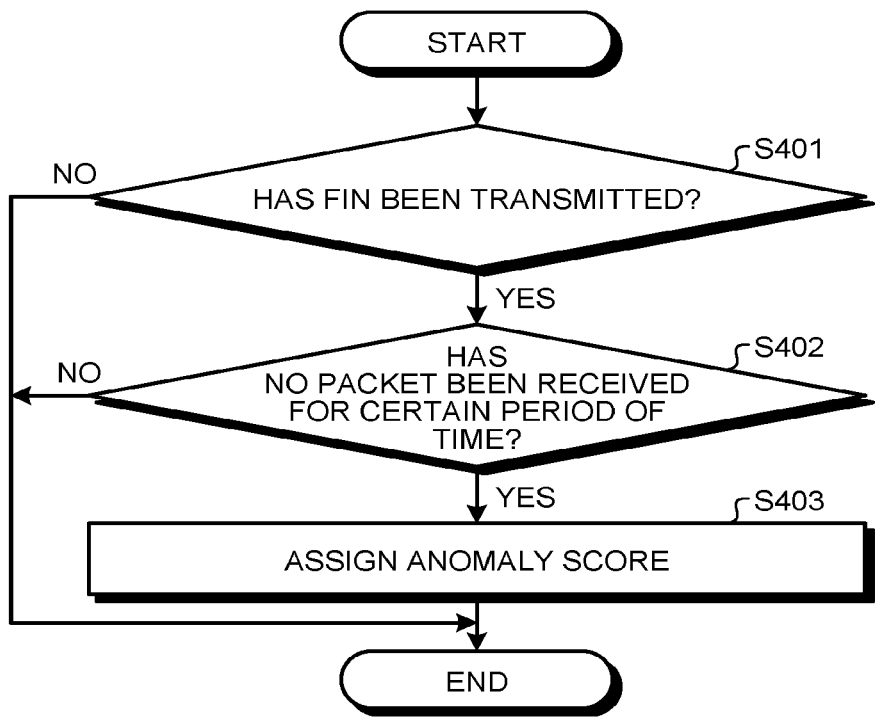
FIG. 11 is a flowchart illustrating an example of the detection process of the connection control apparatus according to the first embodiment.

In Method 3, as illustrated in FIG. 11, the TCP-connection-normality analysis function 236 determines whether a packet with TCP flag FIN set has been transmitted from the server (Step S401). When the packet has been transmitted (Yes at S401) and no packet has been received for a certain period of time (Yes at Step S402), the score calculator 24 assigns an anomaly score to the source IP address (Step S403). When a packet with TCP flag FIN set has not been transmitted from the server (No at Step S401), or when a packet has already been received or when the certain period of time has not elapsed (No at Step S402), the score calculator 24 does not assign an anomaly score.

(Method 4)

Figure 12:
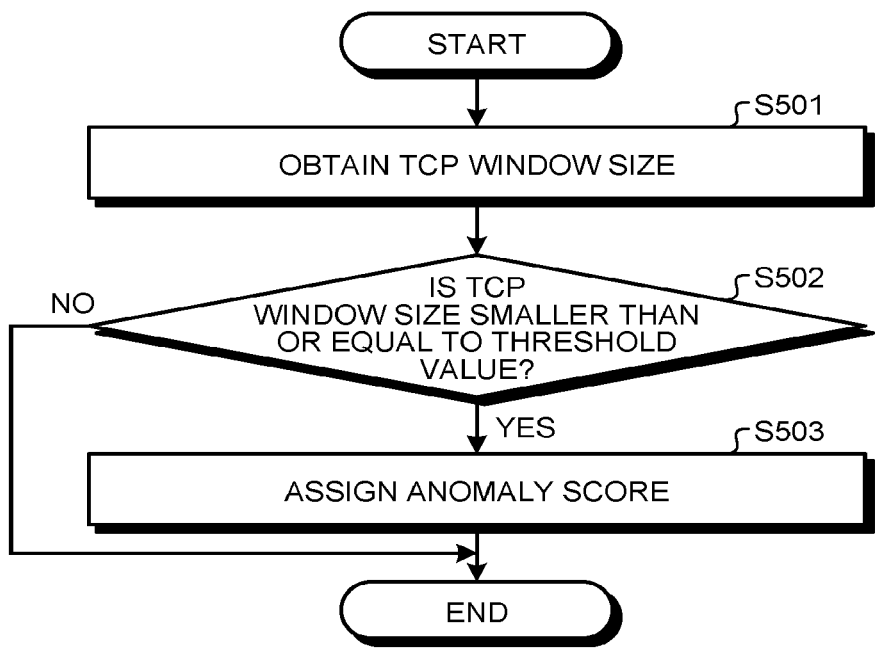
FIG. 12 is a flowchart illustrating an example of the detection process of the connection control apparatus according to the first embodiment.
Figure 13:
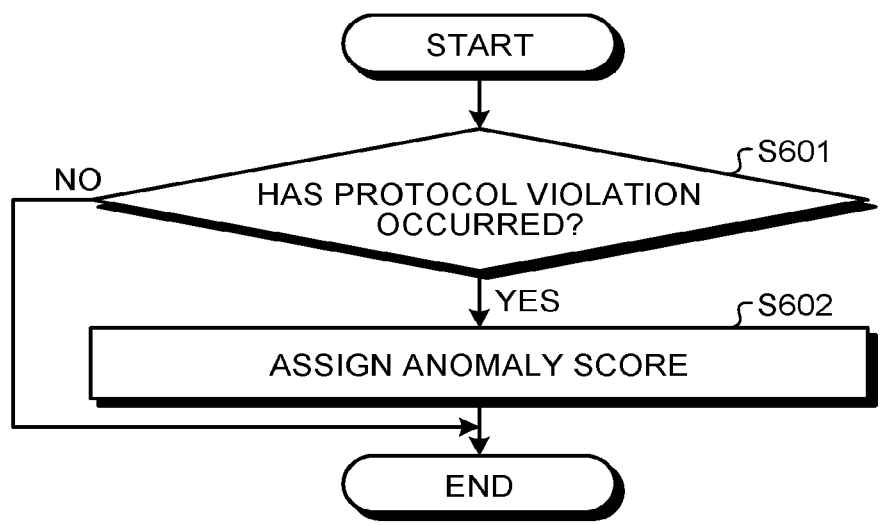
FIG. 13 is a flowchart illustrating an example of the detection process of the connection control apparatus according to the first embodiment.

In Method 4, as illustrated in FIG. 12, the TCP-window-size analysis function 235 obtains a TCP window size (Step S501). When, for instance, the obtained TCP window size is smaller than or equal to a threshold value (Yes at Step S502), the score calculator 24 assigns an anomaly score to the source IP address (Step S503). When the obtained TCP window size is neither smaller than nor equal to the threshold value (No at S502), the score calculator 24 does not assign an anomaly score.

(Method 5)

In Method 5, the protocol-violation discrimination function 237 determines whether a protocol violation has occurred (Step S601). When it is determined that a protocol violation has occurred (Yes at Step S601), the score calculator 24 assigns an anomaly score to the source IP address (Step S602). When it is determined that no protocol violation has occurred (No at Step S601), the score calculator 24 does not assign an anomaly score.

Advantages of First Embodiment

In the connection control apparatus 1, the connection count calculator 21 calculates a TCP connection count, which is the number of TCP connections established between a server and a client, of each of servers. In the connection control apparatus 1, the determiner 22 determines whether the TCP connection count of each of the servers is larger than or equal to a predetermined threshold value. Furthermore, in the connection control apparatus 1, when the TCP connection count of a server of the servers is determined to be larger than or equal to the predetermined threshold value by the determiner 22, the anomalous connection detector 23 detects anomalous connection that conducts denial-of-service attack on the server. Thereafter, the packet controller 30 controls packet transmission and reception between the server and a client of the anomalous connection.

When the TCP connection count of each of the servers is rather small, connection occupying attack is substantially unfeasible. Hence, performing anomalous connection detection and packet control is not only unnecessary but also can affect normal traffic. However, in the connection control apparatus 1, the connection count calculator 21 and the determiner 22 perform anomalous connection detection and packet control only when necessary. Hence, the connection control apparatus 1 can prevent connection occupying attack without affecting normal traffic.

The connection count calculator 21 summarizes counts of the TCP connections on a per-destination-IP-address basis, where the destination IP addresses are contained in header information of packets of the TCP connections. This allows the connection count calculator 21 to obtain necessary information even when information, such as connection counts, is not directly obtainable from servers.

When a count of the TCP connections summarized on a per-source-IP-address basis, where the source IP addresses are contained in the header information of the packets of the TCP connections, is larger than or equal to a predetermined threshold value, the anomalous connection detector 23 detects the TCP connections as anomalous connection. This allows detecting a client that has established a large number of TCP connections to occupy TCP connection capacity.

The anomalous connection detector 23 detects a TCP connection as anomalous connection when a ratio of an actual throughput, which is calculated from a packet size of a packet transmitted and received over the TCP connection, to a theoretical throughput, which is calculated from a TCP window size and a round-trip time of the TCP connection, is smaller than or equal to a predetermined threshold value. This allows detecting a connection that is performing communication over a long period of time at an abnormally low throughput.

The anomalous connection detector 23 detects a TCP connection as anomalous connection when the TCP connection is closed by the server and the TCP connection is not closed by the client. This allows preventing a situation where connections in the half-closed state undesirably occupy TCP connection capacity in spite of that the connections are not used.

The anomalous connection detector 23 detects a TCP connection as anomalous connection when a TCP window size of the TCP connection is smaller than a predetermined threshold value or when a ratio of a packet size of a packet of the TCP connection to the TCP window size is smaller than or equal to a predetermined threshold value. This allows detecting and preventing an attack attempting to occupy connections by performing packet transmission, reception, or the like intentionally over a long period of time.

The anomalous connection detector 23 detects a TCP connection as anomalous connection when a packet violating a protocol is transmitted and received over the TCP connection. This allows detecting and preventing an attack that continuously sends an incomplete HTTP header to the server to place the server in a standby state and cause the server to consume processes, thereby placing the server in a connection-disabled condition.

The packet controller 30 controls packet transmission and reception by transmitting, to the client of anomalous connection, a packet that resets the TCP connection. This allows resetting the connection with the attacking client without affecting clients performing normal communication.

The packet controller 30 controls packet transmission and reception by setting a filter that discards packets of the anomalous connection. This allows shutting off communication with the attacking client without affecting clients performing normal communication.

The packet controller 30 controls packet transmission and reception by redirecting packets of the anomalous connection to another server prepared in advance. This allows further examining whether the connection is anomalous in the other server that performs communication and handling the connection as normal connection when the connection is determined not to be anomalous.

The first embodiment is configured to include the controller and configured such that when anomalous connection is detected by the detector, the controller performs packet control. However, the present invention is not limited thereto. For example, a configuration, in which the controller is not included and a result of detection by the detector is used in generating a blacklist, may alternatively be employed.

Other Embodiments

The anomalous connection detector 23 may be configured to detect anomalous connection using a method, into which two or more of Methods 1 to 5 described above are combined. For instance, the anomalous connection detector 23 may employ a method, into which Method 2 and Method 4 are combined.

In this case, for instance, the anomalous connection detector 23 firstly determines whether a TCP window size of a TCP connection is smaller than a predetermined threshold value or whether a ratio of a packet size of a packet of the TCP connection to the TCP window size is smaller than or equal to a predetermined threshold value.

Upon determining that the TCP window size is smaller than the predetermined threshold value or that the ratio of the packet size to the TCP window size is smaller than or equal to the predetermined threshold value, the anomalous connection detector 23 performs processing of Method 4. Specifically, the anomalous connection detector 23 calculates a ratio of an actual throughput of the TCP connection to its theoretical throughput, and detects the TCP connection as anomalous connection when the calculated ratio is smaller than or equal to a predetermined value.

This allows reducing an amount of calculations performed by the anomalous connection detector 23. Furthermore, this allows reducing probability of error detection where the anomalous connection detector 23 detects a normal TCP connection as anomalous TCP connection, thereby increasing detection accuracy.

The method of control performed by the packet controller 30 to prevent an attack is not limited to setting a filter and redirecting packets; the packet controller 30 may use any desired method. For instance, the packet controller 30 may transmit, to a client of anomalous connection, an invalid packet, such as a SYN/ACK packet containing a cookie, or a SYN/ACK packet, an ACK packet, or an RST packet each containing an invalid ACK sequence number, and requests a response thereto. Alternatively, for instance, the packet controller 30 may request the client of anomalous connection to return a response with an HTTP cookie or JavaScript (registered trademark). Further alternatively, for instance, the packet controller 30 may request the client of anomalous connection to return a response by moving a mouse or using Completely Automated Public Turing test to tell Computers and Humans Apart (CAPTCHA).

A configuration in which, when a response that matches the response request is returned from the client, manual judgment or judgment by an apparatus or the like is made and, when the client is judged to be normal, the cancellation function 332 omits the client from controlled objects, may be employed.

[System Configuration, Etc.]

The elements of the illustrated apparatuses are functionally conceptual and are not necessarily physically configured as illustrated. Specifically, specific forms of distribution and integration of each apparatus are not limited to those illustrated, and all or a part thereof can be functionally or physically distributed or integrated in any unit in accordance with various loads, usage, and the like. All or any part of processing functions to be performed by each apparatus can be implemented by a central processing unit (CPU) and a program parsed and executed by the CPU, or be implemented as hardware by wired logic.

Furthermore, all or a part of processes described in the embodiment as processes to be performed automatically may be performed manually; all or a part of processes described as processes to be performed manually may be performed automatically by a known method or methods. Processing procedures, control procedures, specific names, and information including various data and parameters presented in this document or drawings may be changed as desired unless otherwise specified.

[Program]

Figure 14:
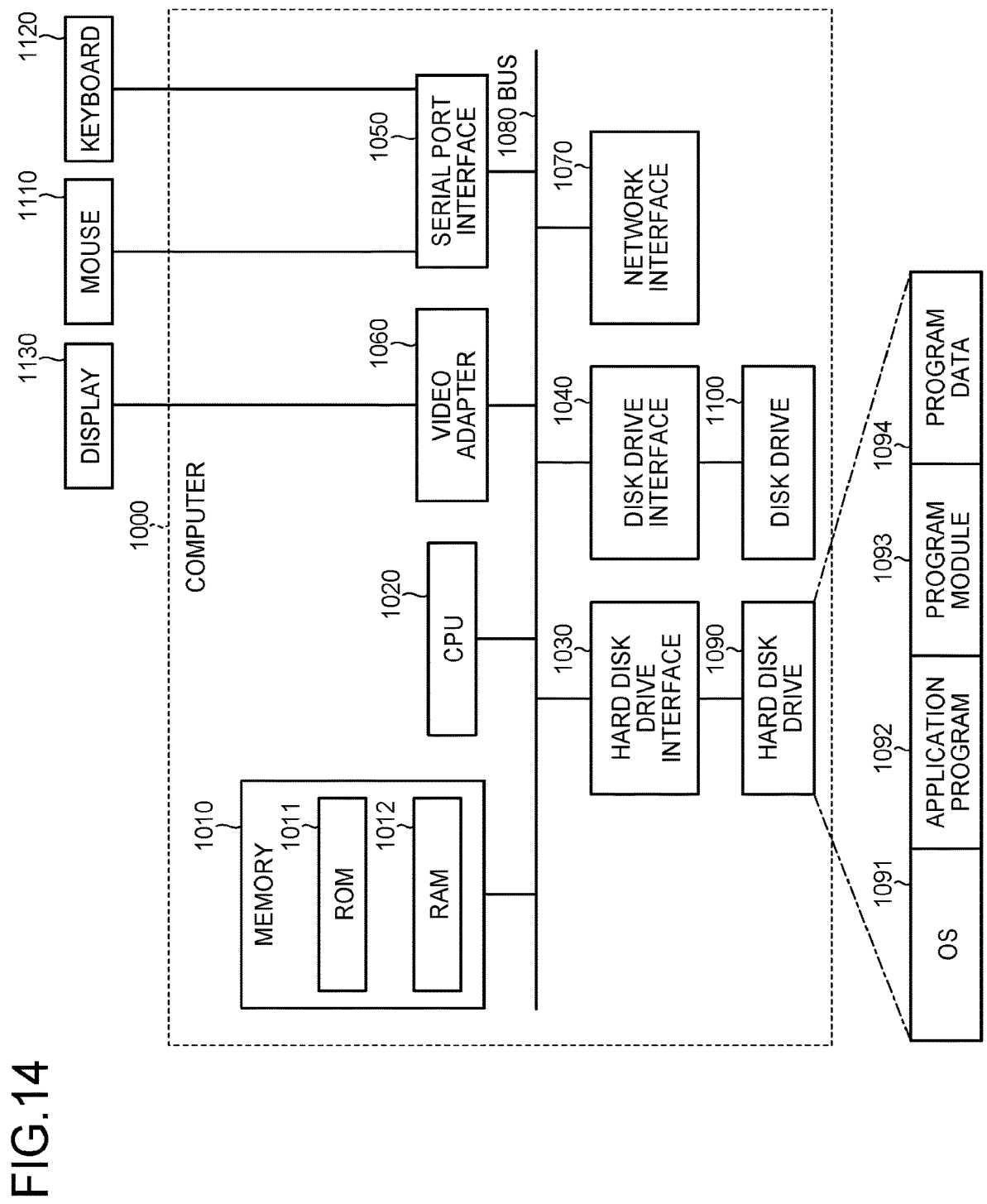
FIG. 14 is a diagram illustrating an example of a computer where a program is executed to implement the connection control apparatus.

FIG. 14 is a diagram illustrating an example of a computer where the connection control apparatus 1 is implemented by executing a program. A computer 1000 includes, for instance, a memory 1010 and a CPU 1020. The computer 1000 further includes a hard disk drive interface 1030, a disk drive interface 1040, a serial port interface 1050, a video adapter 1060, and a network interface 1070. These units are connected via a bus 1080.

The memory 1010 includes a read only memory (ROM) 1011 and a random access memory (RAM) 1012. The ROM 1011 stores, for instance, a boot program, such as Basic Input Output System (BIOS). The hard disk drive interface 1030 is connected to a hard disk drive 1090. The disk drive interface 1040 is connected to a disk drive 1100. A removable recording medium, e.g., a magnetic disc or an optical disc, is inserted into the disk drive 1100. The serial port interface 1050 is connected to, for instance, a mouse 1110 and a keyboard 1120. The video adapter 1060 is connected to, for instance, a display 1130.

The hard disk drive 1090 stores, for instance, an OS 1091, an application program 1092, a program module 1093, and program data 1094. Specifically, the program that defines processes of the connection control apparatus 1 is implemented as the program module 1093 where computer-executable codes are described. The program module 1093 is stored in, for instance, the hard disk drive 1090. For instance, the program module 1093 for executing processing similar to that of functional components of the connection control apparatus 1 is stored in the hard disk drive 1090. The hard disk drive 1090 may be replaced with a solid state drive (SSD).

Setting data for use in the processes of the above-described embodiment is stored as the program data 1094 in, for instance, the memory 1010 or the hard disk drive 1090. The CPU 1020 loads the program module 1093 and the program data 1094 stored in the memory 1010 or the hard disk drive 1090 into the RAM 1012 as required and executes the program module 1093.

The program module 1093 and the program data 1094 are not necessarily stored in the hard disk drive 1090. For instance, the program module 1093 and the program data 1094 may be stored in a removable recording medium and read out therefrom by the CPU 1020 via, for instance, the disk drive 1100. Alternatively, the program module 1093 and the program data 1094 may be stored in another computer connected via a network (e.g., a Local Area Network (LAN) or a Wide Area Network (WAN)). The program module 1093 and the program data 1094 may be read out from the other computer by the CPU 1020 via the network interface 1070.

REFERENCE SIGNS LIST 1 connection control apparatus
2, 3 server
4 switch
5, 6 client
10 interface
20 packet information analyzer
21 connection count calculator
22 determiner
23 anomalous connection detector
24 score calculator
30 packet controller
31 reset-packet transmission function
32 filter function
33 redirection function
211 TCP-header analysis function
212 per-server-basis-connection-count calculation function
231 packet-receipt-time analysis function
232 per-source-IP-address-basis summarization function
233 throughput analysis function
234 packet-size analysis function
235 TCP-window-size analysis function
236 TCP-connection-normality analysis function
237 protocol-violation discrimination function
321, 331 IP-address recording function
322, 332 cancellation function

The invention claimed is:

1. A connection control apparatus comprising:
processing circuitry configured to
calculate a TCP connection count, the TCP connection count being the number of TCP connections established between a server and a client on a network, of each of servers on the network;
determine whether to perform anomalous connection detection based on whether the TCP connection count of each of the servers is larger than or equal to a predetermined threshold value; and
when the TCP connection count of a server of the servers is determined to be larger than or equal to the predetermined threshold value, detect an anomalous connection that conducts a denial-of-service attack on the server by performing a combination of at least two different specific methods of determining an anomalous connection, and when the TCP connection count of a server of the servers is determined to be less than the predetermined threshold value, bypass further detection of an anomalous connection,
wherein one of the least two different specific methods includes, when a ratio of an actual throughput calculated from a packet size of a packet transmitted and received over a TCP connection of the TCP connections to a theoretical throughput calculated from a TCP window size and a round-trip time of the TCP connection is smaller than or equal to a predetermined threshold value, the processing circuitry detecting the TCP connection as an anomalous connection and assigning an anomaly score to a client corresponding to a source IP address of the anomalous connection, and another of the at least two different specific methods includes, when a TCP connection of the TCP connections is closed by the server and the TCP connection is not closed by the client, the processing circuitry detecting the TCP connection as anomalous connection and assigning an anomaly score to a client corresponding to a source IP address of the anomalous connection.

2. The connection control apparatus according to claim 1, wherein the processing circuitry summarizes counts of the TCP connections on a per-destination-IP-address basis, where the destination IP addresses are contained in header information of packets of the TCP connections.

3. The connection control apparatus according to claim 1, wherein another of the at least two different specific methods includes, when a TCP window size of a TCP connection of the TCP connections is smaller than a predetermined threshold value or when a ratio of a packet size of a packet of the TCP connection to the TCP window size is smaller than or equal to a predetermined threshold value, the processing circuitry detecting the TCP connection as anomalous connection and assigning an anomaly score to a client corresponding to a source IP address of the anomalous connection.

4. The connection control apparatus according to claim 1, the processing circuitry being further configured to control packet transmission and reception between the server and the client that has established the detected anomalous connection.

5. The connection control apparatus according to claim 4, wherein the processing circuitry is configured to control packet transmission and reception by transmitting a TCP-connection reset packet to the client of the anomalous connection.

6. The connection control apparatus according to claim 4, wherein the processing circuitry is configured to control packet transmission and reception by setting a filter that discards packets of the anomalous connection.

7. The connection control apparatus according to claim 4, wherein the processing circuitry is configured to control packet transmission and reception by redirecting packets of the anomalous connection to a server prepared in advance.

8. A connection control method to be performed by a connection control apparatus, the connection control method comprising:
calculating a TCP connection count, the TCP connection count being the number of TCP connections established between a server and a client on a network, of each of servers on the network;
determining whether the TCP connection count of each of the servers is larger than or equal to a predetermined threshold value; and
when the TCP connection count of a server of the servers is determined to be larger than or equal to the predetermined threshold value at the determining, detecting anomalous connection that conducts a denial-of-service attack on the server by performing a combination of at least two different specific methods of determining an anomalous connection, and when the TCP connection count of a server of the servers is determined to be less than the predetermined threshold value, bypass further detection of an anomalous connection,
wherein one of the least two different specific methods includes, when a ratio of an actual throughput calculated from a packet size of a packet transmitted and received over a TCP connection of the TCP connections to a theoretical throughput calculated from a TCP window size and a round-trip time of the TCP connection is smaller than or equal to a predetermined threshold value, the detecting the TCP connection as an anomalous connection and assigning an anomaly score to a client corresponding to a source IP address of the anomalous connection, and
another of the at least two different specific methods includes, when a TCP connection of the TCP connections is closed by the server and the TCP connection is not closed by the client, detecting the TCP connection as anomalous connection and assigning an anomaly score to a client corresponding to a source IP address of the anomalous connection.

9. A non-transitory computer-readable recording medium having stored a connection control program that causes a computer to execute a process comprising:
calculating a TCP connection count, the TCP connection count being the number of TCP connections established between a server and a client on a network, of each of servers on the network;
determining whether the TCP connection count of each of the servers is larger than or equal to a predetermined threshold value; and
when the TCP connection count of a server of the servers is determined to be larger than or equal to the predetermined threshold value at the determining, detecting anomalous connection that conducts a denial-of-service attack on the server by performing a combination of at least two different specific methods of determining an anomalous connection, and when the TCP connection count of a server of the servers is determined to be less than the predetermined threshold value, bypass further detection of an anomalous connection,
wherein one of the least two different specific methods includes, when a ratio of an actual throughput calculated from a packet size of a packet transmitted and received over a TCP connection of the TCP connections to a theoretical throughput calculated from a TCP window size and a round-trip time of the TCP connection is smaller than or equal to a predetermined threshold value, the detecting the TCP connection as an anomalous connection and assigning an anomaly score to a client corresponding to a source IP address of the anomalous connection, and
another of the at least two different specific methods includes, when a TCP connection of the TCP connections is closed by the server and the TCP connection is not closed by the client, detecting the TCP connection as anomalous connection and assigning an anomaly score to a client corresponding to a source IP address of the anomalous connection.

* * * * *